C. H. BERRY.
COMPENSATING GAGE.
APPLICATION FILED MAY 12, 1920.

1,376,505.

Patented May 3, 1921.

Inventor
C. Harold Berry
By Shepherd Campbell
Attorney

UNITED STATES PATENT OFFICE.

CHARLES HAROLD BERRY, OF DETROIT, MICHIGAN.

COMPENSATING GAGE.

1,376,505. Specification of Letters Patent. Patented May 3, 1921.

Application filed May 12, 1920. Serial No. 380,880.

*To all whom it may concern:*

Be it known that I, CHARLES HAROLD BERRY, a citizen of the United States, residing at 368 Clarendon avenue, Detroit, in the county of Wayne and State of Michigan, have invented certain new and useful Improvements in Compensating Gages, of which the following is a specification, reference being had therein to the accompanying drawings.

The object of the present invention is to provide a gage constructed in such manner that the true pressure may be ascertained therefrom without computation, irrespective of variations in atmospheric pressure.

The present invention contemplates the provision of a gage having a dial graduated in terms of absolute pressure, a pressure indicating pointer movable with respect to said dial and connections to shift the said pointer with respect to the dial in such manner as to compensate for variations in atmospheric pressure.

In my copending application Serial Number 380,879, filed on the 12th day of May, 1920, I have disclosed a construction of the nature of that above indicated. The present application relates to a modified form of apparatus by virtue of which the results may be secured in a very simple and economical manner.

In the accompanying drawing in which like reference characters designate corresponding parts throughout the several figures.

Figure 1:
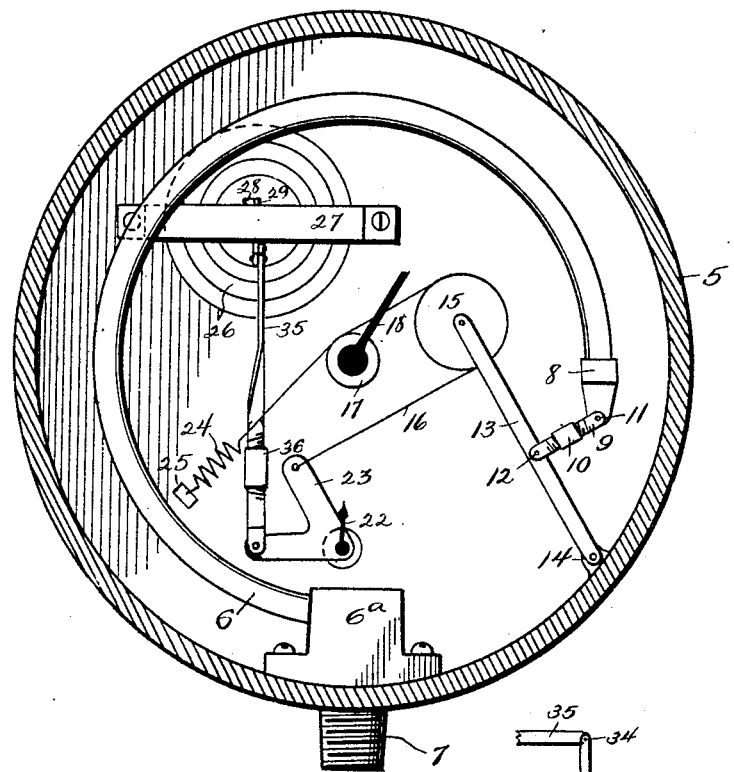
Figure 1 is a view of a gage constructed in accordance with the invention with the case of the gage shown in section and with the pointer controlling mechanism in elevation.
Figure 2:
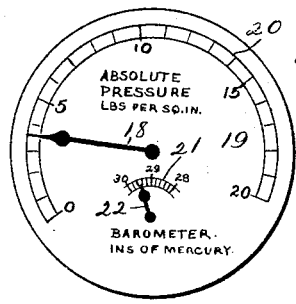
Fig. 2 is a reduced face view of the dial of the gage.

In the drawing 5 designates the case of the gage. This case houses a pressure actuated element such as a Bourdon tube 6. This tube receives pressure through a block 6ª that is provided with a threaded connection 7 of a usual and known character. The extremity of the Bourdon tube 5 carries a head 8. A link 9 which includes a turnbuckle 10 in its length is pivotally connected to the head 8 at 11 and is pivotally connected at 12 to a swinging lever 13. The lever 13 is pivoted at 14 to the case of the gage and carries a drum or roller 15 at its other end. A wire or cable 16 passes over the drum 15 and over a drum 17 that is fast upon the shaft of the pressure actuating pointer 18 of the gage. This pointer moves over the face of the dial 19 in the usual and well known way and coacts with a pressure scale 20 formed thereon. This pressure scale is so related to the pointer that its zero point corresponds to absolute pressure or to a true vacuum rather than to atmospheric pressure as is ordinarily the case. The dial 19 also carries a barometric scale 21 with which a pointer 22 coacts. The pointer 22 is mounted concentric to the pivot point of a bell crank lever 23 to which one end of the cable 16 is connected. The opposite end of the cable is connected to a spring 24, said spring in turn being connected to a fixed element 25 carried by the case. The cable 16 may be given one or more turns around the drum 17 and it is manifest that with the bell crank 23 held in a fixed position a given expansive movement of the Bourdon tube will result in moving the pointer 18 to a definite and predetermined degree. It will also be seen that the degree of movement of the pointer 18 may be varied by movement of the bell crank 23 to draw upon or slacken the cord or cable 16. The bell crank 23 may be actuated either automatically under the influence of a barometer or manually to such an extent that the resultant modification of the movement of the pointer 18 will be just sufficient to compensate for fluctuations in atmospheric pressure. If the movement of the bell crank 23 is to be effected automatically a barometer such as an aneroid barometer, for example, the box of which is indicated at 26, may be employed. This barometer is spanned by a strap 27 which carries a depending lug 28. The extremity of one arm 29 of an L-shaped lever is pivoted at 30 to the lug 28. A stud 31 carried by the box 26 of the barometer is pivoted at 32 to the arm 29. The other arm of the L-shaped lever indicated at 33 is pivoted at 34 to a link 35 which preferably includes a turnbuckle 36 within its length.

Figure 3:
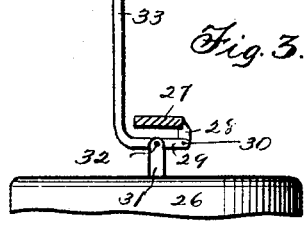
Fig. 3 is a detailed sectional view illustrating the manner of connecting an aneroid barometer with other parts of the mechanism.
Figure 4:
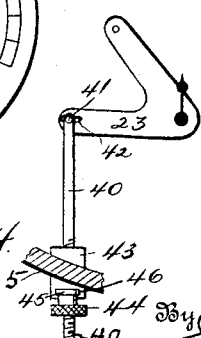
Fig. 4 is a detailed view illustrating a manual control for effecting the compensatory action.

Upon a reduction in atmospheric pressure the top of the box 26 will rise throwing the arm 33 to the right in Fig. 3 and drawing upon the link 35. This will result in slackening the wire 16 and will permit the spring 24 to move the pointer 18 to the left independently of any movement of the Bourdon tube. The opposite action will take place upon an increase in atmospheric pressure. When the setting of the bell crank 23 is thus effected automatically by means of a barometer the pointer 22 indicates barometric changes upon the scale 21 and thus causes the device to serve the double function of compensating gage and a barometer.

The means for effecting the setting of the bell crank 23 manually, comprises a rod 40 carrying a pin 41 operable in a slot 42 formed in one arm of the bell crank lever 23. The rod 40 is freely movable longitudinally through a block 43 of the case 5. A thumb nut 44 is threaded upon the rod 40 and has a collar 45 which is engaged with a recessed part 46 of the block 43 whereby said thumb nut is held against endwise movement. However, it may be rotated with respect to the rod 40 and thus impart an endwise movement to said rod to shift the bell crank 23. In this case the pointer 22 indicates upon the scale 21 when the movement of the bell crank 23 has been such as to effect the proper compensation in the reading of the pointer 18 upon the scale 20 for the then existing atmospheric pressure as determined by the reading of a separate barometer.

In order that the reason for providing the compensatory action set forth may be fully appreciated, it is pointed out that practically all of the gages in use at the present time are constructed in such manner as to indicate pressures above and below atmospheric pressure, as datum. In other words, the zero points of the said gages correspond to atmospheric pressure instead of corresponding to a complete vacuum. However, since the atmospheric pressure constantly varies, it is manifest that such gages cannot accurately represent the true absolute pressure existing in the space to which the gage is connected, because such space has no connection with the atmosphere, and the pressure therein prevailing does not vary with the atmospheric pressure. Under present conditions, if it is desired to determine an accurate value of the absolute pressure from an ordinary type of gage, it is necessary to read both the gage and the barometer, whose readings must be reduced to the same units, if they are not already in the same units, and added together, if the pressure measured is above atmospheric pressure. In measuring a pressure which is less than atmospheric, the vacuum gage is read, the barometer is read and the reading of the vacuum gage is subtracted from the barometer reading.

It is manifest that the dials may be graduated in many different ways in accordance with the work that the gage is called upon to do. The pressures may be indicated in any units whatever, English, metric, or any other, and in correspondence with the pressure scales, there may be scales of the temperature of vaporization of any substance or scales of any other quantity which varies with and depends upon the temperature, such, for example, as scales of the density of saturated vapor, of total heat or the like.

As is well known Bourdon tube gages gradually shift their zero point with age and sustained pressure. The method commonly employed for correcting this is to remove the pointer from the stem and press it on again in a new position, so that the gage registers correctly. The provision of the turnbuckle 10 renders it possible to calibrate the gage without removing the pointer, while the turnbuckle 36 provides means for correcting the barometer reading as indicated by the pointer 22.

It is to be understood that the invention is not limited to the precise construction set forth but that it includes within its purview whatever changes fairly come within either the terms or the spirit of the appended claims.

Having described my invention, what I claim is—

1. A gage comprising a dial, a pointer operable thereover, a pressure actuated member, a flexible element operatively connected to the pointer, connections between the pressure actuated member and the flexible element for exerting a drawing action upon the latter in accordance with movement of the pressure actuated member and means operable in accordance with variations in atmospheric pressure for causing movement of the flexible element with relation to and independently of the pressure actuated member, as and for the purposes set forth.

2. A gage comprising a dial, a pointer operable thereover, a pressure actuated member, a flexible strand, a drum upon the pointer shaft with which the flexible strand is engaged, connections between the pressure actuated member and the flexible strand comprising a bodily movable drum over which said flexible strand passes, a movable element to which one end of said flexible strand is attached and means for effecting movement of said element in accordance with fluctuations in atmospheric pressure.

3. A structure as recited in claim 2 wherein the means for effecting movement of said element comprises a barometer, a barometric scale upon the dial and a pointer movable under the influence of said barometer and coöperating with said scale.

4. A gage comprising a dial, a pointer operable thereover, a pressure actuated member, a swinging lever, a link connecting said swinging lever with the pressure operated member, a rotative drum carried by said swinging lever, a flexible element passing over said drum, a drum upon the pointer over which said element passes, a spring to which the flexible element is connected, a movable member to which the other end of the flexible element is connected and means for effecting movement of the movable element in accordance with variation in atmospheric pressure.

5. A structure as recited in claim 4 in combination with a barometric scale upon the dial and a pointer operable in consonance with said movable member and coacting with said barometric scale.

In testimony whereof I hereunto affix my signature.

CHARLES HAROLD BERRY.